(12) United States Patent
Chen et al.

(10) Patent No.: US 10,199,180 B2
(45) Date of Patent: Feb. 5, 2019

(54) FABRIC SUPERCAPACITOR

(71) Applicant: Board of Regents, The University of Texas System, Austin, TX (US)

(72) Inventors: Jonathan Y. Chen, Austin, TX (US); Yuxiang Huang, Austin, TX (US); Yue Liu, Austin, TX (US)

(73) Assignee: BOARD OF REGENTS, THE UNIVERSITY OF TEXAS SYSTEMS, Austin, TX (US)

( * ) Notice: Subject to any disclaimer, the term of this patent is extended or adjusted under 35 U.S.C. 154(b) by 0 days.

(21) Appl. No.: 15/723,504

(22) Filed: Oct. 3, 2017

(65) Prior Publication Data

US 2018/0096801 A1    Apr. 5, 2018

Related U.S. Application Data (60) Provisional application No. 62/403,451, filed on Oct. 3, 2016.

(51) Int. Cl.
| | |
|---|---|
| *H01G 11/86* | (2013.01) |
| *H01G 11/24* | (2013.01) |
| *H01G 11/34* | (2013.01) |
| *H01G 11/40* | (2013.01) |

(Continued)

(52) U.S. Cl.
CPC .......... *H01G 11/86* (2013.01); *B32B 2250/40* (2013.01); *B32B 2262/106* (2013.01); *B32B 2307/204* (2013.01); *B32B 2457/16* (2013.01); *B82Y 40/00* (2013.01); *D04H 1/4242* (2013.01);

(Continued)

(58) Field of Classification Search
None
See application file for complete search history.

(56) References Cited

U.S. PATENT DOCUMENTS

| | | | | |
|---|---|---|---|---|
| 2002/0136887 A1* | 9/2002 | Penneau | .............. | B01D 67/003 428/317.9 |
| 2016/0322646 A1* | 11/2016 | Kajiwara | .............. | D04H 1/4242 |

OTHER PUBLICATIONS

Huang, Yuxiang et al., "Biobased Nano Porous Active Carbon Fibers for High-Performance Supercapacitors," ACS Applied Materials & Interfaces, ACS Publications, 2016, pp. A-K.

(Continued)

*Primary Examiner* — Dion Ferguson
(74) *Attorney, Agent, or Firm* — Meunier Carlin & Curfman LLC (57) ABSTRACT

Fabric supercapacitors are disclosed herein. The fabric supercapacitor can include an ion permeable separator layer having two opposed surfaces; two electrode layers disposed on the opposed surfaces of the ion permeable separator layer; and two conducting layers disposed on outer surfaces of the two electrode layers and opposite the ion permeable separator layer. The electrode layers can comprise an activated carbon fiber fabric. The activated carbon fiber fabric can be derived from a precursor fabric which has been carbonized, activated, and coated with an electrolyte. The electrolyte can include a polymer gel. The conducting layers can include a non-activated carbon fiber fabric. The fabric supercapacitors disclosed herein exhibit great flexibility which allows the supercapacitors to find use in applications such as apparel products, outdoor activity products, sports wears, and other industrial end uses. Methods of making fabric supercapacitors are also disclosed.

21 Claims, 4 Drawing Sheets

(51) Int. Cl.
    *B82Y 40/00*         (2011.01)
    *D04H 1/4242*      (2012.01)

(52) U.S. Cl.
    CPC .............. *H01G 11/24* (2013.01); *H01G 11/34* (2013.01); *H01G 11/40* (2013.01)

(56) References Cited

OTHER PUBLICATIONS

Wang, Gongming et al., Solid-State Supercapacitor Based on Activated Carbon Cloths Exhibits Excellent Rate Capability, Adv. Mater., 2014, 26, 2676-2682.

Jin, H.Y. et al., "Controllable functionalized carbon fabric for highperformance all-carbon-based supercapacitors," RSC Adv., 2014, 4, 33022-33028.

Lekakou, C. et al., "Carbon-Based Fibrous EDLC Capacitors and Supercapacitors," Journal of Nanotechnology, Hindawi Publishing Corporation, vol. 2011, Article ID 409382, 8 pages.

Jost, Kristy et al., "Natural Fiber Welded Electrode Yarns for Knittable Textile Supercapacitors," Adv. Energy Mater., 2014, 1401286, 8 pages.

Cai, Zhenbo et al., "Flexible, weavable and efficient microsupercapacitor wires based on polyaniline composite fibers incorporated with aligned carbon nanotubes," J. Mater. Chem. A, 2013, 1, 258-261.

Zhai, Shengli et al., "All-carbon solid-state yarn supercapacitors from activated carbon and carbon fibers for smart textiles," Mater. Horiz., 2015, 2, 598-605.

\* cited by examiner

FABRIC SUPERCAPACITOR

RELATED APPLICATION

This application claims priority to U.S. Patent Application No. 62/403,451, filed Oct. 3, 2016, entitled "Fabric Supercapacitor," the contents of which are incorporated herein by reference.

FIELD

The present disclosure relates to supercapacitors, particularly to compositions and methods to produce supercapacitors with all fabric materials.

BACKGROUND

The development of improved energy storage devices is one of the keys for successful global energy management. However, one challenge is the improvement of transportable energy in applications such as wearable energy. Many research efforts focus on either directly overlaying conventional batteries onto existing textiles or coating energy storage materials on fabrics. Such approaches face tremendous difficulties in connections, bulkiness, wearability, and safety. An emerging tactic is to directly incorporate energy storage materials, as supercapacitors, at the formation stages of textile fibers. Supercapacitors, like batteries, can store energy and be used as a power source. While batteries store and release charge through chemical reactions, supercapacitors store it on the surface of their electrodes. Thus, supercapacitors can charge in minutes instead of hours and can recharge millions of times. Multiple textile fibers can be spun into energy storage yarns which can be further fabricated into energy storage fabrics. Fiber supercapacitors, however, have limited dimensions and these devices can present challenges during the weaving process. There have been some studies on fabric electrode supercapacitors. However, these supercapacitors exhibited some practical limitations such as being relatively thick, which affects their flexibility. There is still a need for more lightweight, compact, and mechanically flexible energy storage devices. The compositions and methods disclosed herein address these and other needs in the art.

SUMMARY

Disclosed herein are supercapacitors derived from all fabric materials. The fabric supercapacitor can include (a) an ion permeable separator layer having two opposed surfaces; (b) two electrode layers disposed on the opposed surfaces of the ion permeable separator layer which have been coated with an electrolyte, and (c) two conducting layers disposed on outer surfaces of the two electrode layers and opposite the ion permeable separator layer.

The electrode layers can comprise an activated carbon fiber fabric. In some embodiments, the activated carbon fiber fabric can be derived from a precursor fabric which has been carbonized and activated. The precursor fabric can be derived from a biomaterial or polymer precursor. For example, the precursor fabric can include cellulosics, polyacrylonitrile, phenolic resins, polyamides including aromatic polyamides, polyvinyl alcohol, poly(p-phenylene benzobisoxazole) (PBO), polyolefins, polyesters, pitch, or combinations thereof. The activated carbon fiber fabric can have a carbon content of at least 60% by weight, based on the total weight of the activated carbon fiber fabric. For example, the carbon content of the activated carbon fiber fabric can be from 60 to 95% by weight, based on the total weight of the activated carbon fiber fabric. The surface area of the activated carbon fiber fabric can be 1000 $m^2/g$ or greater, such as from 1000 $m^2/g$ to 2500 $m^2/g$. The activated carbon fiber fabric can have a basis weight of from 130 $g/m^2$ to 180 $g/m^2$ and a thickness of 0.50 mm or less.

The activated carbon fiber fabric can be modified with a nanoparticle, such as transition metal oxide (TMO) or lanthanide metal oxide nanoparticles. Specific examples of nanoparticles can include $ZnO_2$ and $CeO_2$. The activated carbon fiber fabric and added nanoparticle can be in a weight ratio of, for example, from 10:1 to 2.5:1.

In some embodiments, the activated carbon fiber fabric is a woven fabric.

The conducting layers in the fabric supercapacitors can comprise a non-activated carbon fiber fabric. The non-activated carbon fiber fabric can be derived from a woven, knitted, or non-woven fabric. The non-activated carbon fiber fabric can have a carbon content of at least 95% by weight of the non-activated carbon fiber fabric. The basis weight of the non-activated carbon fiber fabric can be 200 $g/m^2$ or less, such as from 50 $g/m^2$ to 200 $g/m^2$. The thickness of the conducting layers can be 0.30 mm or less.

As described herein, the fabric supercapacitors can include an electrolyte. The electrolyte can be coated on a surface of each electrode layers. In some embodiments, the electrolyte can be in the form of a polymer gel. The polymer gel can include a polymer selected from polyvinyl alcohol, polyvinyl acetate, starch, or combinations thereof. The polymer gel can further include a lithium salt, phosphoric acid, sulfuric acid, potassium hydroxide, or a combination thereof. Examples of polymer gel electrolytes that can be used in the fabric supercapacitors include polyvinyl alcohol-$H_3PO_4$, polyvinyl alcohol-$H_2SO_4$, or polyvinyl alcohol-KOH. The electrolyte content of the fabric supercapacitor can be 50% or more by weight, based on the total weight of the electrode layers.

The ion permeable separator layer in the fabric supercapacitors can comprise a fabric mesh. Suitable fabric meshes include polyester based meshes (such as a polyester plain weave mesh or a polyester warp knitted mesh). The basis weight of the fabric mesh can be 80 $g/m^2$ or less, such as from 40 $g/m^2$ to 70 $g/m^2$. The thickness of the fabric mesh can be 0.10 mm or greater, such as from 0.12 to 0.20 mm.

The fabric supercapacitors disclosed herein can exhibit a high specific area capacitance. In some embodiments, the fabric supercapacitors can exhibit a specific area capacitance of 8 mF $cm^{-2}$ or greater (e.g., 10 mF $cm^{-2}$ or greater, 15 mF $cm^{-2}$ or greater, 20 mF $cm^{-2}$ or greater, 25 mF $cm^{-2}$ or greater, 30 mF $cm^{-2}$ or greater, 40 mF $cm^{-2}$ or greater, 50 mF $cm^{-2}$ or greater, 60 mF $cm^{-2}$ or greater, 70 mF $cm^{-2}$ or greater, 80 mF $cm^{-2}$ or greater, 90 mF $cm^{-2}$ or greater, or 95 mF $cm^{-2}$ or greater) at 2 mV $s^{-1}$.

The fabric supercapacitors disclosed herein can be directly charged, for example, with solar cells to harvest and store solar energy.

Methods of producing the fabric supercapacitors are also disclosed. The method can include depositing a first electrode layer on a surface of a first conducting layer, depositing an ion permeable separator layer on a surface of the first electrode layer opposed to the first conducting layer, depositing a second electrode layer on a surface of the ion permeable separator layer opposed to the first electrode layer, and depositing a second conducting layer on a surface of the second electrode layer opposed to the ion permeable separator, to form a fabric supercapacitor assembly.

Also disclosed herein are articles prepared from the fabric supercapacitors disclosed herein. Such articles can include garments and housings (such as tents).

Additional advantages of the disclosure will be set forth in part in the description which follows, and in part will be obvious from the description, or may be learned by practice of the disclosure. The advantages of the disclosure will be realized and attained by means of the elements or combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DETAILED DESCRIPTION

The compositions, systems, and methods described herein may be understood more readily by reference to the following detailed description of specific aspects of the disclosed subject matter and the Examples and Figures included therein.

Before the present compositions, systems, and methods are disclosed and described, it is to be understood that the aspects described below are not limited to specific synthetic methods or specific reagents, as such may, of course, vary. It is also to be understood that the terminologies used herein are for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a polymer" includes mixtures of two or more such polymers, reference to "the surface" includes two or more surfaces, reference to "an electrolyte" includes mixtures of two or more of such electrolytes, and the like.

"Optional" or "optionally" means that the subsequently described event or circumstance can or cannot occur, and that the description includes instances where the event or circumstance occurs and instances where it does not.

The term "about," as used herein, is intended to qualify the numerical values which it modifies, denoting such a value as variable within a margin of error. When no particular margin of error, such as a standard deviation to a mean value given in a chart or table of data, is recited, the term "about" should be understood to mean that range which would encompass the recited value and the range which would be included by rounding up or down to that figure as well, taking into account significant figures.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Reference will now be made in detail to specific aspects of the disclosed materials, compounds, compositions, articles, and methods, examples of which are illustrated in the accompanying Examples and Figures.

Compositions and Systems

Figure 1:
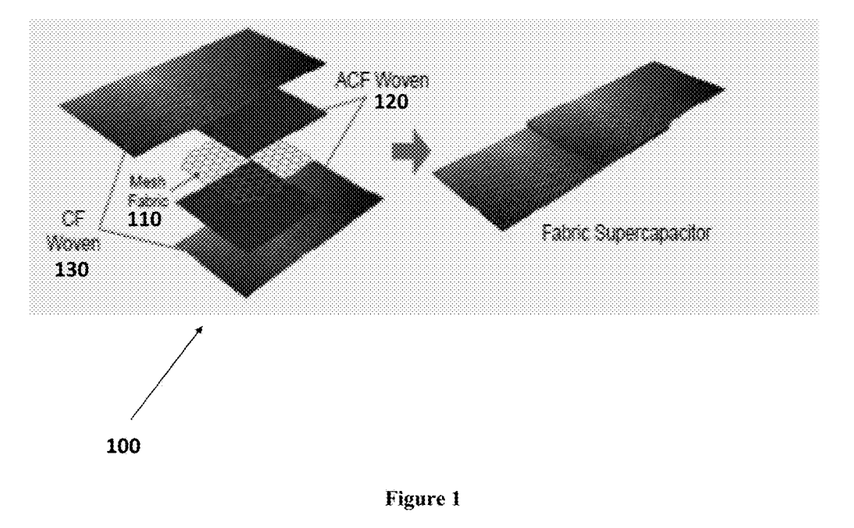
FIG. 1 is a schematic diagram illustrating the assembly of an exemplary multilayer fabric supercapacitor.

Provided herein are fabric supercapacitors. FIG. 1 is a schematic diagram showing the assembly components of an exemplary fabric supercapacitor 100. In FIG. 1, the fabric supercapacitor 100 comprises an ion permeable separator layer 110 having two opposed surfaces, two electrode layers 120 disposed on opposed surfaces of the ion permeable separator layer 110, and two conducting layers 130 disposed on outer surfaces of the two electrode layers and opposite the ion permeable separator layer. The ion permeable separator layer, the electrode layers, and the conducting layers can optionally include one or more sub-layers.

The ion permeable separator layer 110 can be derived from a mesh material. A "mesh" as used herein, refers to any semi-permeable barrier layer comprising a woven or non-woven material. The ion permeable separator layer 110 is a non-conducting layer that prevents contact and shorting between the two electrode layers. The separator layer is permeable to allow ion flow between the electrodes. The ion permeable separator layer can be derived from any suitable material such as a polyalkylene material, a polyester material, or a combination thereof. In some embodiments, the ion permeable separator layer can be derived from a polyester plain weave mesh, a polyester warp knitted mesh, or a functionalized (or hydrophilic) polyethylene mesh.

The mesh material used to form the ion permeable separator layer can have a basis weight of 80 g/m$^2$ or less. For example, the mesh material can have a basis weight of 75 g/m$^2$ or less, 70 g/m$^2$ or less, 60 g/m$^2$ or less, or 50 g/m$^2$ or less. In some embodiments, the mesh material can have a basis weight of 40 g/m$^2$ or greater, 50 g/m$^2$ or greater, 60 g/m$^2$ or greater, 70 g/m$^2$ or greater, or 80 g/m$^2$ or greater. In some embodiments, the mesh material can have a basis weight of from 40 g/m$^2$ to 80 g/m$^2$ or from 50 g/m$^2$ to 70 g/m$^2$.

As described herein, the supercapacitor 100 can include at least two electrode layers disposed on opposed surfaces of the ion permeable separator layer 110. The electrode layers can include an activated carbon fiber (ACF) fabric. The term "activated carbon" as used herein, refers to a material that includes a substantial amount of carbon and has been treated, such as by heating, to increase its adsorptive capacity. The activated carbon fiber fabric disclosed herein has been activated to produce a large surface area in a fabric form. It is desirable that the activated carbon fiber fabric has a large surface area. In particular, the activated carbon fiber fabric can serve as building blocks for energy storage due to their large surface area, high specific capacitance, and other unique electrical and mechanical properties. Generally, the larger the surface area is, the better the ion adsorbing capacity of the activated carbon fiber fabric. Notably, however, is that the storage capacitance of the supercapacitor can decrease when the surface area of the activated carbon fiber fabric is too large.

In some embodiments, the activated carbon fiber fabric can have a surface area of 1000 m$^2$/g or greater. For example, the activated carbon fiber fabric can have a surface area of 1100 m$^2$/g or greater, 1200 m$^2$/g or greater, 1400 m$^2$/g or greater, 1500 m$^2$/g or greater, 1600 m$^2$/g or greater, 1800 m$^2$/g or greater, 2000 m$^2$/g or greater, 2200 m$^2$/g or greater, or 2400 m$^2$/g or greater. In some embodiments, the activated carbon fiber fabric can have a surface area of 2500 m$^2$/g or less, 2400 m$^2$/g or less, 2300 m$^2$/g or less, 2200 m$^2$/g or less, 2000 m$^2$/g or less, or 1800 m$^2$/g or less. In some embodiments, the activated carbon fiber fabric can have a surface area of from 1000 m$^2$/g to 2500 m$^2$/g, from 1200 m$^2$/g to 2500 m$^2$/g, or from 1500 m$^2$/g to 2500 m$^2$/g. The surface area of the activated carbon fiber fabric can be determined using the Brunauer-Emmett-Teller (BET) equation. In particular, a physisorption analyzer is used to measure reduced vapor pressure due to gas adsorption of a sample, in which a known volume of gas has been added, at a cryogenic temperature. A physisorption isotherm is obtained which is then used to calculate the surface area.

The activated carbon fiber fabric may be derived from a natural or non-natural carbonaceous precursor material. For example, the activated carbon fiber fabric can be derived from a biomaterial or a synthetic polymer precursor. In some embodiments, the activated carbon fiber fabric can be derived from a polymer precursor such as polyamides (including aromatic polyamides), polyesters, polyethers, polyolefins, polysaccharides, phenolic resins, phenol formaldehyde resins, polyacenaphthalenes, polyarylethers, polyvinylchloride, polyvinylidene chloride, poly(p-phenylene terephthalamide), poly(p-phenylene benzobisoxazole), poly-L-lactide, polyimides, polyurethanes, nylons, pitch, polyacrylonitrile (including polyacrylonitrile copolymers such as poly(acrylonitrile-methyl acrylate), poly(acrylonitrile-methyl methacrylate), poly(acrylonitrile-itaconic acid-methyl acrylate), poly(acrylonitrile-vinyl pyridine), poly(acrylonitrile-vinyl chloride) and poly(acrylonitrile-vinyl acetate)), or combinations thereof. In some embodiments, the polymer precursor can include a cellulosic material. As described herein, the precursor material can be carbonized and activated to form the activated carbon fiber fabric. Methods for carbonizing and activating materials are known in the art and are also described herein.

The carbon content of the activated carbon fiber fabric may vary depending on the material from which it is derived. In some embodiments, the activated carbon fiber fabric can include 40% by weight or greater, of carbon. For example, the activated carbon fiber fabric can include 50% by weight or greater, 55% by weight or greater, 60% by weight or greater, 65% by weight or greater, 70% by weight or greater, 75% by weight or greater, 80% by weight or greater, or 85% by weight or greater, of carbon. In some embodiments, the activated carbon fiber fabric can include 85% by weight or less, 80% by weight or less, 75% by weight or less, 70% by weight or less, 65% by weight or less, or 60% by weight or less, of carbon. In some embodiments, the activated carbon fiber fabric can include 40% to 85% by weight, 45% to 85% by weight, 50% to 85% by weight, or 50% to 80% by weight of carbon. The carbon content of the activated carbon fiber fabric can be determined by X-ray photoelectronic spectroscopy (XPS).

The activated carbon fiber fabric described herein can further include nanoparticle. The term "nanoparticle" as used herein, refers to any structure with one or more nanosized features. A nanosized feature can be any feature with at least one dimension less than 1 μm in size. The nanoparticle can have any of a wide variety of shapes including for example, spheroidal and elongated nanostructures. Thus, the term nanoparticle includes nanowires, nanotubes, spheroidal nanoparticles, and the like, or combinations thereof.

The nanoparticles present in the activated carbon fiber fabric can have an average diameter of 900 nanometers (nm) or less such as 800 nm or less, 600 nm or less, 500 nm or less, 400 nm or less, 300 nm or less, 250 nm or less, 200 nm or less, 100 nm or less, or 50 nm or less. In some embodiments, the average diameter of the nanoparticle can be 5 nm or greater, 50 nm or greater, 100 nm or greater, 150 nm or greater, 200 nm or greater, 250 nm or greater, 300 nm or greater, 400 nm or greater, or 500 nm or greater. The average diameter of the nanoparticle can range from any of the minimum values described above to any of the maximum values described above. For example, the average diameter of the nanoparticle can range from 5 nm to 700 nm, from 5 nm to 500 nm, from 50 nm to 500 nm, or from 50 nm to 250 nm.

The nanoparticles can be encapsulated within the activated carbon fiber fabric, dispersed throughout the activated carbon fiber fabric, or form a layer/coating on the activated carbon fiber fabric. The nanoparticles can attach permanently or semi-permanently to the activated carbon fiber fabric. The nanoparticles can adhere to the activated carbon fiber fabric covalently or non-covalently. In some cases, the nanoparticle is unreactive with the activated carbon fiber fabric.

The nanoparticles can confer certain desirable properties to the activated carbon fiber fabric. For example, the nanoparticles can be present to enable a redox reaction for the purpose of enhancing supercapacitor performance. In some embodiments, the nanoparticle can include transition metals or lanthanide metals, such as iron, silver, cerium, zinc, gold, copper, cobalt, nickel, platinum, manganese, rhodium, ruthenium, palladium, titanium, vanadium, chromium, molybdenum, cadmium, mercury, calcium, aluminum, zirconium, iridium, silicon, an oxide thereof, zeolite, graphite, carbon nanotubes, or a combination thereof. Specific examples of nanoparticles include transition metal oxides or lanthanide metal oxides, such as cerium oxide, titanium oxide, tin oxide, iron oxide, cesium oxide, zinc oxide, alumina, silica, or a combination thereof.

The activated carbon fiber can comprise 5% or greater by weight nanoparticle (i.e. based on the total weight of the activated carbon fiber and the nanoparticle). For example, the activated carbon fiber can comprise 10% or greater, 12% or greater, 15% or greater, 18% or greater, 20% or greater, 22% or greater, 25% or greater, 30% or greater, 35% or greater, 40% or greater, 45% or greater, or 50% or greater by weight nanoparticle, based on the weight of the activated carbon fiber. In some examples, the activated carbon fiber can comprise 60% or less, 55% or less, 50% or less, 45% or less, 40% or less, 35% or less, 30% or less, 25% or less, 20% or less, 18% or less, 15% or less, 12% or less, or 10% or less by weight nanoparticle, based on the weight of the activated carbon fiber. The amount of nanoparticles in the activated carbon fiber can range from any of the minimum values described above to any of the maximum values described above. For example, the amount of nanoparticle in the activated carbon fiber can range from 5% to 55%, 10% to 50%, 10% to 40%, 10% to 30%, 15% to 35%, or 15% to 30% by weight, based on the weight of the activated carbon fiber.

In some embodiments, the weight ratio of the nanoparticles to activated carbon fiber in the fabric can be 1:1 or less. For example, the weight ratio of the nanoparticle to activated carbon fiber in the fabric can be 1:2 or less, 1:3 or less, 1:4 or less, 1:5 or less, 1:6 or less, 1:7 or less, 1:8 or less, 1:9 or less, 1:10 or less, or 1:12 or less. In some embodiments, the weight ratio of the nanoparticles to activated carbon fiber in the fabric can be at least 1:20 (e.g., at least 1:18, at least 1:15, at least 1:12, at least 1:10, at least 1:8, at least 1:6, at least 1:5, or at least 1:4). The weight ratio of nanoparticle to activated carbon fiber in the fabric can range from any of the minimum values described above to any of the maximum values described above. For example, the weight ratio of nanoparticles to activated carbon fiber in the composition can range from 1:25 to 1:1 (e.g., from 1:15 to 1:3, from 1:10 to 1:2, or from 1:10 to 1:5).

The weight of the activated carbon fiber fabric may depend on the specific use of the supercapacitor. The weight of the activated carbon fiber fabric can influence the overall capacitance of the supercapacitor. It is believed that heavier/thicker fabrics can increase the ion storing capacity of the supercapacitor. In some embodiments, the activated carbon fiber fabric can have a basis weight of 250 g/m² or less, 240 g/m² or less, 230 g/m² or less, 220 g/m² or less, 210 g/m² or less, 200 g/m² or less, 190 g/m² or less, 180 g/m² or less, 170 g/m² or less, 160 g/m² or less, 150 g/m² or less, 140 g/m² or less, or 130 g/m² or less. In some embodiments, the activated carbon fiber fabric can have a basis weight of 120 g/m² or greater, 130 g/m² or greater, 140 g/m² or greater, 150 g/m² or greater, 160 g/m² or greater, 170 g/m² or greater, 180 g/m² or greater, 190 g/m² or greater, or 200 g/m² or greater. In some embodiments, the activated carbon fiber fabric can have a basis weight of from 130 g/m² to 250 g/m², from 130 g/m² to 200 g/m², or from 130 g/m² to 180 g/m².

As described above, thicker fabrics may help increase the ion storing capacity of the supercapacitor. However, thicker fabrics may also decrease the supercapacitor's flexibility. The thickness of the activated carbon fiber fabric can be 50 µm or greater, 100 µm or greater, 200 µm or greater, 250 µm or greater, 300 µm or greater, 350 µm or greater, 400 µm or greater, 450 µm or greater, 500 µm or greater, 600 µm or greater, 650 µm or greater, or 700 µm or greater. In some embodiments, the thickness of the activated carbon fiber fabric can be 1,000 µm or less, 800 µm or less, 700 µm or less, 600 µm or less, 500 µm or less, or 400 µm or less. In some embodiments, the thickness of the activated carbon fiber fabric can be from 50 µm to 1,000 µm, from 100 µm to 800 µm, or from 100 µm to 500 µm.

As described herein, the activated carbon fiber fabric can be derived from a woven or non-woven fabric. The term "woven" as used herein includes weaves (such as plain weaves, twill weaves, and satin weaves), and knits. In some cases, the activated carbon fiber fabric can be derived from non-woven felts.

Suitable activated carbon fiber fabrics for use in the supercapacitors described herein are known in the art. For example, suitable activated carbon fiber fabrics are available under the tradename KYNOL™ or ZORFLEX®.

The supercapacitors described herein can also include a non-activated carbon fiber fabric. Unlike the activated carbon fiber fabric, the non-activated carbon fiber fabric has not been treated to improve its surface area. The non-activated carbon fiber fabric can provide electrical conduction between the supercapacitor and an outer device. The conductivity of the non-activated carbon fiber fabric can be at least $0.50 \times 10^3$ s/cm, such as from $0.60 \times 10^3$ to $1.50 \times 10^3$ s/cm.

The non-activated carbon fiber fabric can include 90% by weight or greater, of carbon. In some embodiments, the non-activated carbon fiber fabric can include 92% by weight or greater, 95% by weight or greater, 97% by weight or greater, 99% by weight or greater, or up to 100% by weight of carbon. In some embodiments, the non-activated carbon fiber fabric can include 100% by weight or less, 98% by weight or less, 95% by weight or less, or 93% by weight or less of carbon. In some embodiments, the non-activated carbon fiber fabric can include from 90% to 100% by weight or from 90% to 98% by weight of carbon.

The non-activated carbon fiber fabric can be derived from filaments, yarns, or towings, which is then combined into a fabric. The fabric can be a woven fabric (including twilled fabrics), a knitted fabric, or a felted nonwoven fabric. In some embodiments, the non-activated carbon fiber fabric can be derived from a filament yarn. In some embodiments, the non-activated carbon fiber fabric includes a multi-filament yarn. For example, the yarn in the non-activated carbon fiber fabric can comprise a filament bundle of 1,000 or greater, 2,000 or greater, 3,000 or greater, 4,000 or greater, 5,000 or greater, or 6,000 or greater single filaments. In some embodiments, the yarn in the non-activated carbon fiber fabric can comprise a filament bundle of from 1,000 to 6,000 or from 2,000 to 4,000 single filaments.

The non-activated carbon fiber fabric can have a basis weight of 200 g/m² or less, 190 g/m² or less, 180 g/m² or less, 170 g/m² or less, 160 g/m² or less, 150 g/m² or less, 140 g/m² or less, 130 g/m² or less, 120 g/m² or less, 110 g/m² or less, or 100 g/m² or less. In some embodiments, the non-activated carbon fiber fabric can have a basis weight of 100 g/m² or greater, 110 g/m² or greater, 120 g/m² or greater, 130 g/m² or greater, 140 g/m² or greater, 150 g/m² or greater, 160 g/m² or greater, 170 g/m² or greater, or 180 g/m² or greater. In some embodiments, the non-activated carbon fiber fabric can have a basis weight of from 100 g/m² to 200 g/m², from 110 g/m² to 180 g/m², or from 120 g/m² to 160 g/m².

The thickness of the non-activated carbon fiber fabric can be 10 µm or greater, 50 µm or greater, 100 µm or greater, 200 µm or greater, 250 µm or greater, 300 µm or greater, 350 µm or greater, 400 µm or greater, 450 µm or greater, or 500 µm or greater. In some embodiments, the thickness of the non-activated carbon fiber fabric can be 500 µm or less, 400 µm or less, 300 µm or less, 250 µm or less, 200 µm or less, or 500 µm or less. In some embodiments, the thickness of the non-activated carbon fiber fabric can be from 10 µm to 500 µm, from 10 µm to 300 µm, or from 50 µm to 300 µm. Lighter and/or thinner fabrics can be used to increase the flexibility of the supercapacitor.

Suitable non-activated carbon fiber fabrics for use in the supercapacitor are known in the art. For example, non-activated carbon fiber fabrics are available from FibreGlast Developments Corporation, US Composites, Toray Group, and from Rock West Composites.

The fabric supercapacitors described herein can include an electrolyte. The electrolyte provides a charge reservoir for the supercapacitor. For example, the electrolyte can enter the pores of the electrode materials (activated and non-activated carbon fiber fabrics) and provide ionic charge carriers for charge storage.

The electrolyte can be chosen so as to minimize internal resistance of the supercapacitor. For instance, the size of the electrolyte ions may affect their accessibility to the pores of the activated carbon fiber electrode, which, in turn, may influence the extent of the electrical double layer formation. In some embodiments, the electrolyte in supercapacitors can include an organic electrolyte. Organic electrolytes can withstand higher operating voltages due to higher electrochemical decomposition limits than those of aqueous electrolytes. The electrolyte can be a fluid such as a liquid, a semi-solid, or a gel.

In some embodiments, the electrolyte can include a polymer gel. Polymer gel electrolytes have high electrical potential resistance and are less susceptible to leakage problems that can occur with liquid electrolytes. Polymer gel electrolytes are polymer-electrolyte systems in which a polymer forms a matrix for the electrolyte species. Examples of suitable polymers that can be used in the polymer gel electrolytes can include polyvinyl alcohol, polyvinyl acetate, cellulosics such as starch, polyurethane, poly(acrylonitrile), polyacrylamide, poly(ethylene oxide), poly(meth)acrylate, or combinations thereof. In some embodiments, the polymer gel electrolyte can include polyvinyl alcohol (PVA). The molecular weight of the polymer (such as PVA) in the polymer gel can be 20,000 Da or greater, such as from 20,000 to 200,000 Da, from 20,000 to 150,000 Da, or from 20,000 to 100,000 Da. The molecular weight of the polymer may affect the formation condition, such as drying temperature and drying time, and the mechanical strength, such as tensile strength, of the polymer gel electrolyte.

In addition to the polymer, the polymer gel can also include an additional material that can increase the ionic conductivity of the polymer. For example, the polymer gel can include an additional material selected from a lithium salt (for e.g., $LiClO_4$, $LiBF_4$, $LiPF_6$, $LiAsF_6$, $LiCF_3SO_3$, LiBr, $LiCF_3SO_3$, $LiN(CF_3SO_3)_2$), $H_3PO_4$, $H_2SO_4$, KOH, or a combination thereof.

A plasticizer can also be a component of the polymer-electrolyte system.

In some examples, the polymer gel can include an electrolyte system selected from polyvinyl alcohol-$H_3PO_4$, polyvinyl alcohol-$H_2SO_4$, polyvinyl alcohol-KOH, polyvinyl acetate-$H_3PO_4$, polyvinyl acetate-$H_2SO_4$, polyvinyl acetate-KOH, polyurethane-$LiCF_3SO_3$, polyurethane-lithium perchlorate, a poly(acrylonitrile)-lithium salt, a poly(acrylonitrile)-quaternary ammonium salt, polyacrylamide-$H_3PO_4$, polyacrylamide-$H_2SO_4$, polyacrylamide-KOH, a poly(ethylene oxide)-grafted poly(methyl)-methacrylate-quaternary ammonium salt, or a combination thereof. The polymer and the additional electrolyte material can be in a weight ratio of from 1:1 to 5:1.

Other suitable examples of organic electrolytes that can be used in the supercapacitors include tetraalkylammonium salts, also known as quaternary ammonium salts or organic carbonates such as ethylene carbonate, propylene carbonate, propanediol-1,2-carbonate, and dichloroethylene carbonate.

The electrolyte content can be 50% or more by weight, based on the total weight of the fabric supercapacitor. In some embodiments, the electrolyte content can be from 50% to 80% or from 60% to 80% by weight, based on the total weight of the fabric supercapacitor.

The electrolyte can be coated onto a surface of the activated carbon fiber fabric (electrode layers) and optionally the non-activated carbon fiber fabric. In some examples, the activated carbon fiber fabric and optionally the non-activated carbon fiber fabric can be coated with a polymer gel.

As described herein, the fabric supercapacitors include at least two electrode layers coated with an electrolyte, separated by at least one ion permeable separator layer and sandwiched between at least two conducting layers. Multiple conducting layers, electrode layers, and ion separator layers can be used in different embodiments to provide the desired power density and energy density for a particular application. For example, the supercapacitor can independently include 1, 2, 3, 4, 5, 6, 7, 8, 9, or 10 conducting layers, electrode layers, and ion separator layers.

The fabric supercapacitor can have any suitable dimensions depending on its specific use. In some embodiments, the fabric supercapacitor can have a thickness of 300 µm or greater, such as 400 µm or greater, 500 µm or greater, 600 µm or greater, 700 µm or greater, 800 µm or greater, 1,000 µm or greater, 1200 µm or greater, 1,500 µm or greater, 2,000 µm or greater, 2,500 µm or greater, or 3,000 µm or greater. In some embodiments, the fabric supercapacitor can have a thickness of 3,000 µm or less, 2,500 µm or less, 2,000 µm or less, 1,500 µm or less, or 1,000 µm or less. In some embodiments, the fabric supercapacitor can have a thickness of from 300 µm to 3,000 µm, from 500 µm to 2,000 µm, or from 1,000 µm to 2,000 µm.

The fabric supercapacitors described herein can exhibit a high specific area capacitance, 8 mF $cm^{-2}$ or greater, 10 mF $cm^{-2}$ or greater, 15 mF $cm^{-2}$ or greater, 20 mF $cm^{-2}$ or greater, 25 mF $cm^{-2}$ or greater, 30 mF $cm^{-2}$ or greater, 40 mF $cm^{-2}$ or greater, 50 mF $cm^{-2}$ or greater, 60 mF $cm^{-2}$ or greater, 70 mF $cm^{-2}$ or greater, 80 mF $cm^{-2}$ or greater, 90 mF $cm^{-2}$ or greater, 95 mF $cm^{-2}$ or greater, 97 mF $cm^{-2}$ or greater, 100 mF $cm^{-2}$ or greater, 105 mF $cm^{-2}$ or greater, or 110 mF $cm^{-2}$ or greater at 2 mV $s^{-1}$. The capacitance performance of the supercapacitor can be determined by galvanostatic charge-discharge, cyclic voltammetry, AC impedance techniques, or a life cycle test.

Methods

Methods of making the fabric supercapacitors described herein are also disclosed. The method can include sequentially depositing a first electrode layer on a surface of a first conducting layer, depositing an ion permeable separator layer on a surface of the first electrode layer opposed to the first conducting layer, depositing a second electrode layer on a surface of the ion permeable separator layer opposed to the first electrode layer, and depositing a second conducting layer on a surface of the second electrode layer opposed to the ion permeable separator, to form the fabric supercapacitor assembly. Therefore, the layers are stacked in the order of the first conducting layer, the first electrode layer, the ion permeable layer, the second electrode layer, and the second conducting layer to form a supercapacitor.

As described herein, the activated carbon fiber fabric can be derived from a precursor fiber material that has been carbonized and activated. Methods for carbonizing and activating materials are known in the art. For example, carbonizing the precursor fiber material can include heating the precursor fiber material under an inert environment to remove non-carbon elements. Carbonization can start to occur at about 300° C. and the end temperature can be between about 800 and 1000° C., depending on the specific fiber material used. In the activation step, steam or $CO_2$ can be used to react with carbon to create angstrom sized pores. In some embodiments, activation using chemicals (e.g., $H_3PO_4$ and/or $ZnCl_2$) can be carried out. Activation can start to occur at about 300° C. to greater to about 800° C. The carbonization and activation reaction can be performed in a single step. In some examples, an activated carbon fiber can be produced beginning with the precursor fiber material, which is first mixed with water or other appropriate aqueous solvent to produce a wet mass. In some examples, from 30% to 70% by weight (e.g., 40% to 60% by weight) of the precursor carbon fabric and from 30% to 70% by weight (e.g., 40% to 60% by weight) of water can be mixed. The precursor material can be carbonized at a temperature in the range of about 400 to 950° C., for example at about 900° C. under nitrogen flow.

As described herein, a nanoparticle, such as a transition metal oxide or a lanthanide metal oxide can be incorporated into the activated carbon fiber fabric. Methods for incorporating the nanoparticle into the activated carbon fiber fabric can include dispersing the nanoparticle in a solvent to form a suspension. In some embodiments, the suspension can include 1% or greater (e.g., 2% or greater, 5% or greater, 6% or greater, 8% or greater, 10% or greater, 12% or greater, from 1% to 20%, from 1% to 15%, from 1% to 10%, from 2% to 10%) by weight of nanoparticle. Suitable solvents can include water or an alcohol. The method can further include contacting the activated carbon fiber fabric with the nanoparticle suspension. For example, the activated carbon fiber fabric, used to construct two electrodes in the fabric supercapacitor, can be immersed in the nanoparticle suspension to adsorb the nanoparticle via an ultrasonic dispersion. The nanoparticle-loaded electrode fabric can be dried, for example, in an oven at 60° C.

The method of making the fabric supercapacitors can also include coating the electrode layers (activated carbon fiber fabric) with an electrolyte as described herein. The coating can be applied by dipping, brushing, or spraying. As discussed herein, the electrolyte can include a polymer gel. The components of the polymer gel can be applied simultaneously or sequentially. For example, the electrode layers can be coated simultaneously with a polymer gel comprising a polymer and an additional material that can increase the ionic conductivity of the polymer. Alternately, the electrode layers can be coated sequentially with a polymer followed by moistening with water or a solution that can increase the ionic conductivity of the polymer. After coating, the electrode layers are allowed to dry such as by blow drying. The non-activated carbon fiber fabric can be further coated with an electrolyte, using methods as disclosed herein and then dried.

The electrode layers, conducting layers, and ion permeable separator layer used to form the supercapacitor can be compressed at room temperature to 100° C. to bind the layers together. In some cases, the electrode layers, conducting layers, and ion permeable separator layer can be stitched together using for example, a sewing machine.

The fabric supercapacitors disclosed herein can provide a flat structure with great flexibility. Therefore, the fabric supercapacitor is bendable. This unique structure allows the supercapacitor to find use in many special applications, including in textiles such as garment or apparel products (including jackets), protective clothing, outdoor activity products, housings (such as tents), sports wears, emergency services, handbags, hats, umbrella, electronic devices, conducting wires and cables, electrochemical devices such as fiber-based supercapacitors, batteries, solar cells, fuel cells, artificial muscles, and electrochromic articles, field emission and incandescent light emission devices, tissue scaffold applications, and mechanical and chemical sensors.

In some embodiments, the fabric supercapacitors can be included in an apparel such as coats, coveralls, jackets, pants, sleeves, aprons, and other types of apparel. The fabric supercapacitors described herein are useful in and can be incorporated into special applications to produce self-energy supply systems, such as for people working in rural areas or being deployed for military operations. In some embodiments, it may be desirable that the fabric contains filaments which are fire-resistant or possess other desirable properties. Suitable fire-resistant filaments include those made from aramids such as poly (para-phenylene terephthalamide) (PPD-T), poly(meta-phenylene isophthalamide) (MPD-I), and other high strength polymers such as poly-phenylene benzobisoxazole (PBO) and/or blends or mixtures of those fibers.

Examples

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Preparation of a Fabric Supercapacitor

Introduction:

Recent development of supercapacitor technologies try to shift capacitor performance from power density priority to energy density priority, so that it could function as a battery as well. However, EDLC construction is still based on metal, carbon, and liquid electrolyte, nothing related to textile fabrics. Disclosed in the examples below are all-fabric supercapacitors produced as an energy storage device for example, for solar energy harvesting. The developed technology can use a porous fabric and a highly conductive fabric to form a fabric architecture of supercapacitor, also called electric double-layer capacitor (EDLC).

This technology can integrate commercial energy fabrics and flexible solar cells into the new supercapacitor device. Its size and shape can be defined according to different end uses. Thus, the fabric supercapacitor can be directly integrated into apparel, bag, tent, and other consumer products, making these fabric based products a mobile and portable solar power supply. The developed technology does not need any new yarn spinning and fabric forming infrastructures. A simple short supply chain would be expected.

The fabric supercapacitor combined with solar cells can form a self energy-supply system feasible for soldiers being deployed for military operations, or for people working in rural areas without power supplies. It can also be used as lightweight energy storing materials for emergency services operated by organizations like IRC and FEMA.

General:

Two similar pieces of woven non-activated carbon fiber (CF) fabrics cut in 1 cm$^2$ size were used as current collectors. The CF fabrics had a fabric weight of about 212 g/m$^2$ and a fabric thickness of about 0.254 mm. The CF fabrics were commercial grades having a 3K tow size. Two similar pieces of woven activated carbon fiber (ACF) fabrics cut in 1 cm$^2$ size were used as electrodes. The ACF fabrics were derived from a woven cellulose-based twill with a basis weight of about 154 g/m$^2$, fabric thickness of about 0.432 mm, and fabric specific surface area of about 1200 m$^2$/g. The ACF fabrics were immersed in a 20 ml solution of carbon black and then soaked in a gel electrolyte before use. The gel electrolyte was prepared by dissolving 5 g of PVA in 50 ml of deionized water to form a mixture. The mixture was then heated to 90° C. under continuous stirring until the solution became transparent. 5 g of $H_3PO_4$ was added to the mixture with stirring to form a homogeneous PVA-$H_3PO_4$ electrolyte gel. A woven fabric mesh with 44 g/m$^2$ of weight and 0.12 mm of thickness was used as a separator.

Method:

The assembly of the fabric supercapacitor is illustrated in FIG. 1. Specifically, a symmetrical fabric supercapacitor was fabricated by sandwiching the fabric mesh (as a separator) with the two pieces of ACF fabrics and the two pieces of CF fabrics, as shown in FIG. 1. The capacitance of the fabric supercapacitor was determined using the equation $$C + \frac{Q}{2\Delta V} = \frac{1}{2v\Delta V}\int_{V_-}^{V_+} i(V)dV,$$

where Q is the total charge obtained by integrating the area within cyclic voltammetry (CV) curves; $\Delta V$ is the potential window; is the scan rate; and t(V) is current intensity.

Figure 2A:
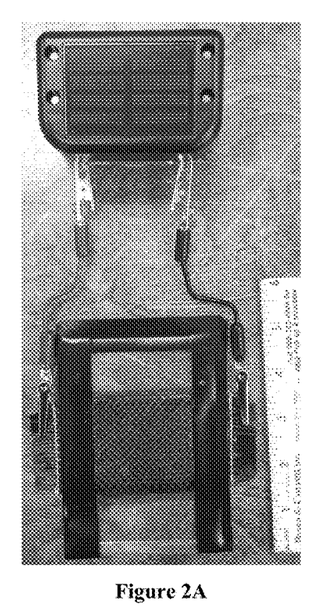
FIG. 2A is an image illustrating a multilayer fabric supercapacitor charged by a solar cell.
Figure 2B:
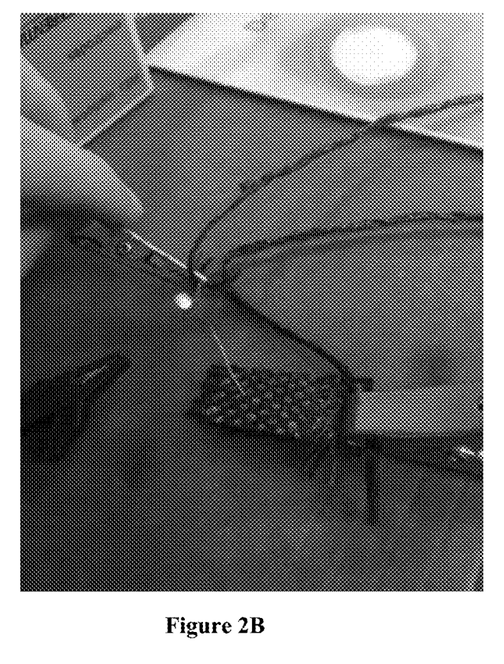
FIG. 2B is an image illustrating a multilayer fabric supercapacitor.
Figure 3:
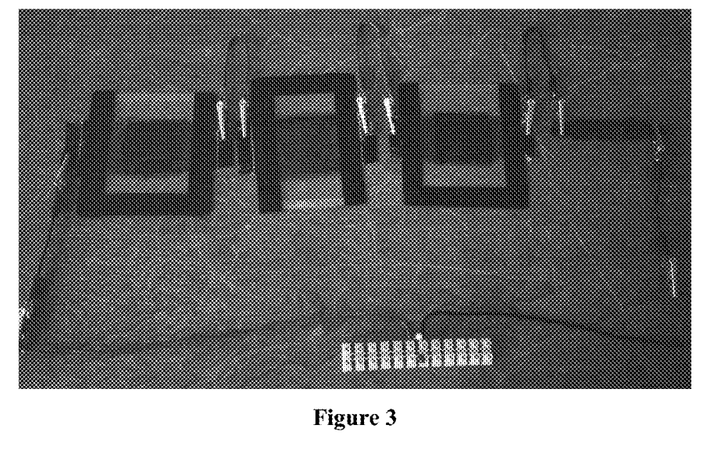
FIG. 3 is an image illustrating four (4) fabric supercapacitor units in a series connection to power an LED. After charged individually by a solar cell with a capacity of charging a 1.2V, 400-mAh NiCd AA battery, the formed series circuit powered an LED (2.4 V, 20 mA) lasting about 2.5 hours.
Figure 4:
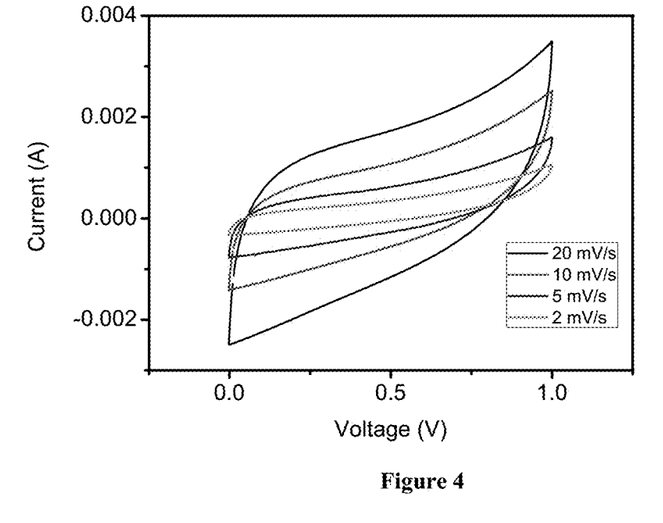
FIG. 4 shows CV curves of fabric supercapacitor 5×5 cm sample at different scan rates. Calculated from the CV curves, the specific area capacitances for fabric supercapacitor at 2, 5, 10 and 20 mV s$^{-1}$ are 3.78, 3.34, 3.02 and 2.62 mF cm$^{-2}$, respectively. The electrode was modified by $CeO_2$ nanoparticle.
Figure 5:
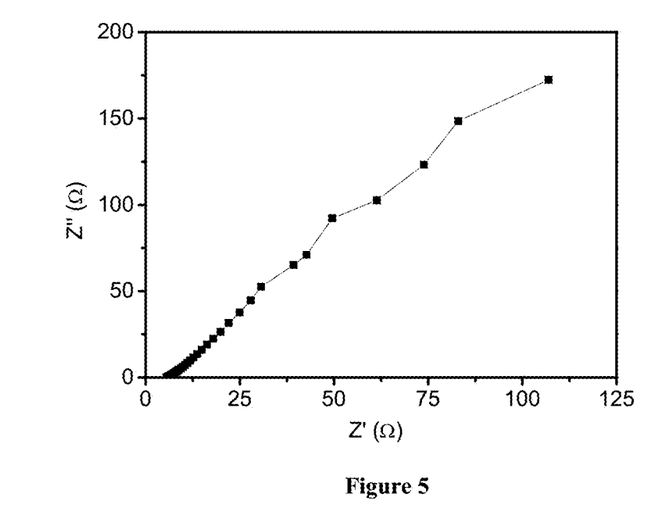
FIG. 5 shows a plot of electrical impedance spectroscopy (EIS) of fabric supercapacitor (5×5 cm, electrode modified by $CeO_2$ nanoparticle), tested from 0.01 to 100 kHz. The equivalent serial internal resistance (ESR) of the fabric supercapacitor was 5.6Ω.
Figure 6:
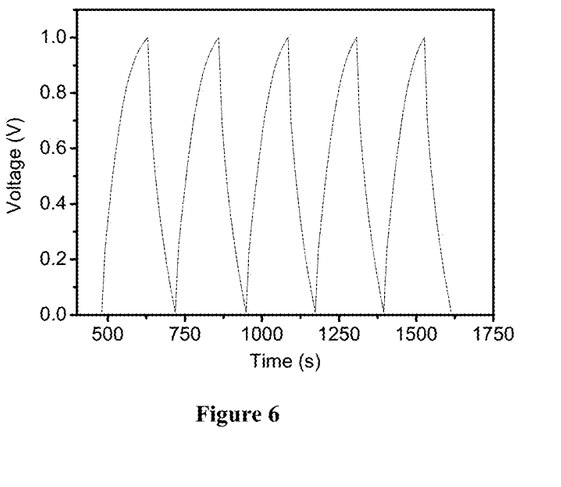
FIG. 6 shows galvanostatic charge/discharge curves of fabric supercapacitor (5×5 cm, electrode modified by $CeO_2$ nanoparticle), tested at 1.0E-05 A cm$^{-2}$.
Figure 7:
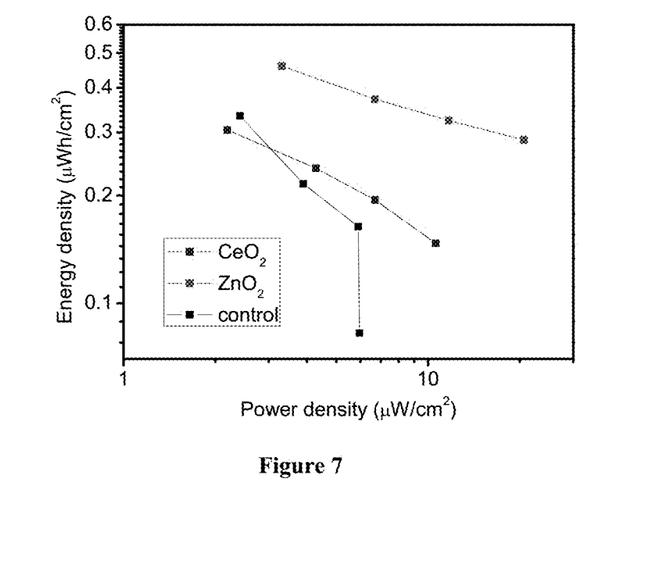
FIG. 7 shows a Ragone plot for comparison of energy storing performance among 3 fabric supercapacitors with 3 different ACF electrodes: Electrode without modification (Control); Electrode modified by nanoparticle $CeO_2$; and Electrode modified by nanoparticle $ZnO_2$.

Results:

The produced fabric supercapacitor provided a multilayer sheeting structure for energy storage (FIG. 2). The fabric supercapacitor exhibited a high specific area capacitance of 97 mF cm$^2$. The equivalent serial internal resistance (ESR) of the fabric supercapacitor was 5.6 Ωcm$^{-1}$. The fabric supercapacitor was flexible, thus making it a wearable electronic component.

Example 2: Fabric Supercapacitor Prototype with CeO$_2$-Loaded Electrode

Structure:

The CF fabric, ACF fabric, separation fabric, and electrolyte used for this preparation are the same as those used in Example 1. The nanoparticle CeO$_2$ used has 99.9% purity, 15-30 nm average particle size, and 30-50 m$^2$ g$^{-1}$ specific surface area. Ten percent CeO$_2$ by weight of the activated carbon fabric was placed into the beaker containing water to form a 1% suspension. After ultrasonic dispersion of the suspension for 30 minutes, the activated carbon fabric was immersed in the suspension. The system was further ultrasonically dispersed for 30 minutes and then dried in an oven at 60□. When the fabric was fully dried, a modified activated carbon fabric was obtained. The method of constructing this supercapacitor is consistent with that described in Example 1.

Specifications:

Measured properties of the modified activated carbon fabric are described in Table 1.

TABLE 1

Prototype Specifications

| Parameter | Value | Test Set |
|---|---|---|
| Size (cm$^2$) | 5 × 5 | |
| Capacitance (mF cm$^{-2}$) | 8.78 | Scan rate 2 mA · s$^{-1}$, 1 V |
| Retention (%) | 96.5 | 2000 charge-discharge cycles at 4 × 10$^{-5}$ A cm$^{-2}$ |
| ESR(Ω) | 5.01 | 0.01-100 kHz |
| Energy Density (μWh cm$^{-2}$) | 0.31 | Scan rate 2 mV s$^{-1}$ |
| Power Density (μW cm$^{-2}$) | 2.19 | Scan rate 2 mV s$^{-1}$ |

Results:

Developed herein is a prototype of supercapacitor cell based on activated carbon fiber (ACF). Electrochemical properties of the prototype supercapacitor were characterized instrumentally, with respect to cyclic voltammetry (CV) curves at scan rates from 5 to 100 mV s-1, galvanostatic charge/discharge (GC) curves, and electrical impedance spectroscopy (EIS) curves with a frequency range from 0.01 Hz to 100 kHz. FIGS. 4-7 show CV curves, electrical impedance, Galvanostatic charge/discharge curves, and Ragone plot for the modified activated carbon fabric. Overall, the ACF-based supercapacitor cell possessed a substantially low equivalent serial internal resistance (ESR), a high capacitance, a high energy density capacity, and an excellent capacitance retention rate.

The developed fabric supercapacitor technology does not rely on any special fiber and fabric that is not available on market. Instead, it can use commercial fabrics for supercapacitor construction. This technology has following technological impact: Reduction of overall weight of materials needed for Forward Operating Base shelter systems; Extension of power supply and capabilities of expeditionary forces through energy harvesting and on-site storage; Chain energy storage materials in multiple tents/shelter systems; among others.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A fabric supercapacitor comprising:
    (a) an ion permeable separator layer having two opposed surfaces;
    (b) two electrode layers disposed on the opposed surfaces of the ion permeable separator layer, wherein each of the electrode layers comprise an activated carbon fiber fabric comprising a precursor fabric which has been carbonized, activated, and coated with an electrolyte; and (c) two conducting layers disposed on outer surfaces of the two electrode layers and opposite the ion permeable separator layer, wherein each conducting layers comprise a non-activated carbon fiber fabric.

2. The fabric of claim 1, wherein the activated carbon fiber fabric is a woven fabric.

3. The fabric of claim 1, wherein the surface area of the activated carbon fiber fabric is from 1000 $m^2/g$ to 2500 $m^2/g$.

4. The fabric of claim 1, wherein the activated carbon fiber fabric has a carbon content of from 60% to 95% by weight, based on the total weight of the activated carbon fiber fabric.

5. The fabric of claim 1, wherein the activated carbon fiber fabric has a basis weight of from 130 $g/m^2$ to 180 $g/m^2$.

6. The fabric of claim 1, wherein the activated carbon fiber fabric has a thickness of 0.50 mm or less.

7. The fabric of claim 1, wherein the precursor fabric includes polyamides, polyolefins, polyesters, cellulosics, polyacrylonitrile, phenolic resins, or combinations thereof.

8. The fabric of claim 1, wherein the activated carbon fiber fabric is modified by nanoparticle selected from a transition metal oxide, a lanthanide metal oxide, or a combination thereof.

9. The fabric of claim 8, wherein the nanoparticle is present in an amount 10% or greater by weight of the activated carbon fiber fabric.

10. The fabric of claim 1, wherein the non-activated carbon fiber fabric is a woven, knitted, or non-woven fabric.

11. The fabric of claim 1, wherein each of the conducting layers have a carbon content of at least 95% by weight of the conducting layer.

12. The fabric of claim 1, wherein the non-activated carbon fiber fabric has a basis weight of from 100 $g/m^2$ to 200 $g/m^2$.

13. The fabric of claim 1, wherein the non-activated carbon fiber fabric has a thickness of 0.30 mm or less.

14. The fabric of claim 1, wherein the electrolyte comprises a polymer gel.

15. The fabric of claim 14, wherein the polymer gel comprises polyvinyl alcohol-$H_3PO_4$, polyvinyl alcohol-$H_2SO_4$, or polyvinyl alcohol-KOH.

16. The fabric of claim 1, wherein the ion permeable separator layer comprises a fabric mesh.

17. The fabric of claim 1, having a specific area capacitance of 8 $mF\ cm^{-2}$ or greater at 2 $mV\ s^{-1}$.

18. An article comprising the fabric of claim 1.

19. The article of claim 18, wherein the article is a garment or a housing.

20. A method of producing a fabric supercapacitor, the method comprising:

depositing a first electrode layer on a surface of a first conducting layer, depositing an ion permeable separator layer on a surface of the first electrode layer opposed to the first conducting layer, depositing a second electrode layer on a surface of the ion permeable separator layer opposed to the first electrode layer, and depositing a second conducting layer on a surface of the second electrode layer opposed to the ion permeable separator, to form a fabric supercapacitor assembly;

wherein each of the electrode layers comprise an activated carbon fiber fabric comprising a precursor fabric which has been carbonized, activated, and coated with an electrolyte; and wherein each of the conducting layers comprise a non-activated carbon fiber fabric.

21. The method of claim 20, comprising contacting the activated carbon fiber fabric with carbon black followed by the electrolyte.

* * * * *